US009336162B1

(12) United States Patent
Sathe et al.

(10) Patent No.: US 9,336,162 B1
(45) Date of Patent: *May 10, 2016

(54) SYSTEM AND METHOD FOR PRE-FETCHING DATA BASED ON A FIFO QUEUE OF PACKET MESSAGES REACHING A FIRST CAPACITY THRESHOLD

(75) Inventors: Satish Sathe, San Ramon, CA (US); Keyur Chudgar, San Jose, CA (US)

(73) Assignee: Applied Micro Circuits Corporation, Santa Clara, CA (US)

( * ) Notice: Subject to any disclaimer, the term of this patent is extended or adjusted under 35 U.S.C. 154(b) by 1121 days.

This patent is subject to a terminal disclaimer.

(21) Appl. No.: 13/398,679

(22) Filed: Feb. 16, 2012

(51) Int. Cl.
*G06F 13/16* (2006.01)
*G06F 12/08* (2006.01)

(52) U.S. Cl.
CPC ........ *G06F 13/1621* (2013.01); *G06F 12/0802* (2013.01); *G06F 12/0862* (2013.01)

(58) Field of Classification Search
None
See application file for complete search history.

(56) References Cited

U.S. PATENT DOCUMENTS

| | | | | |
|---|---|---|---|---|
| 6,148,082 | A * | 11/2000 | Slattery et al. | 380/212 |
| 6,738,838 | B2 * | 5/2004 | Shemla et al. | 710/38 |
| 7,020,712 | B1 * | 3/2006 | Chin | 709/234 |
| 7,426,610 | B2 * | 9/2008 | Lakshmanamurthy et al. | 711/118 |
| 7,773,597 | B2 * | 8/2010 | Chen | 370/392 |
| 7,774,522 | B2 | 8/2010 | Bouvier | |
| 7,921,275 | B2 | 4/2011 | Arimilli et al. | |
| 8,248,945 | B1 * | 8/2012 | Sathe et al. | 370/235 |
| 8,429,315 | B1 * | 4/2013 | Chudgar et al. | 710/55 |
| 8,656,071 | B1 * | 2/2014 | Onufryk et al. | 710/52 |
| 2003/0147409 | A1 * | 8/2003 | Wolrich et al. | 370/412 |
| 2006/0239260 | A1 | 10/2006 | Chen | |
| 2009/0222629 | A1 | 9/2009 | Yano et al. | |
| 2009/0307433 | A1 | 12/2009 | Jones et al. | |
| 2009/0323728 | A1 * | 12/2009 | Koutsoures et al. | 370/503 |
| 2010/0070713 | A1 | 3/2010 | Bercovich et al. | |
| 2010/0077151 | A1 | 3/2010 | Van De Waerdt | |
| 2010/0077154 | A1 | 3/2010 | Chou | |
| 2010/0287137 | A1 | 11/2010 | Lyakhovitskiy | |
| 2011/0022871 | A1 * | 1/2011 | Bouvier et al. | 713/340 |
| 2011/0154080 | A1 * | 6/2011 | Wang et al. | 713/323 |

OTHER PUBLICATIONS

Webopedia, "Queue", Aug. 10, 2002, pp. 1-2, http://web.archive.org/web/20020810034508/http://www.webopedia.com/TERM/Q/queue.html.*
Pimental, Andy D., et al.; Hardware vs. Hybrid Data Prefetching in Multimedia Processors: A Case Study; IEEE PCC Conference; Feb. 2000; IEEE; Phoenix; USA.
Hughes, C.J. and Adve, Sarita; Memory-Side Prefetching for Linked Data Structures; Technical Report UIUCDCS-R-2001-2221; May 2001; Univ of IL at Urbana-Champaign; Urbana: USA.
Byna, Surendra; Data Prefetching in an Era of Multicore Processors; www.multicoreinfo.com; Not Dated; USA.

* cited by examiner

*Primary Examiner* — Christopher D Birkhimer
(74) *Attorney, Agent, or Firm* — Amin, Turocy & Watson LLP; Gregory Turocy

(57) ABSTRACT

A method is provided for pre-fetching packet data prior to processing. The method accepts a plurality of packets and writes each packet into a memory. A message is derived for each packet, where each message includes a packet descriptor with a pointer to an address of the packet in the memory. Each message is added to a tail of a first-in first-out (FIFO) queue. A pre-fetch module examines a first message, if the first message reaches a first capacity threshold of the FIFO queue. If the first message reaches the first capacity threshold, the pre-fetch module reads a first packet associated with the first message, from the memory, and the first packet is loaded into cache memory. A processor reads the first message from a head of the FIFO queue, and in response to reading the first message, reads the previously loaded first packet from cache memory.

12 Claims, 10 Drawing Sheets

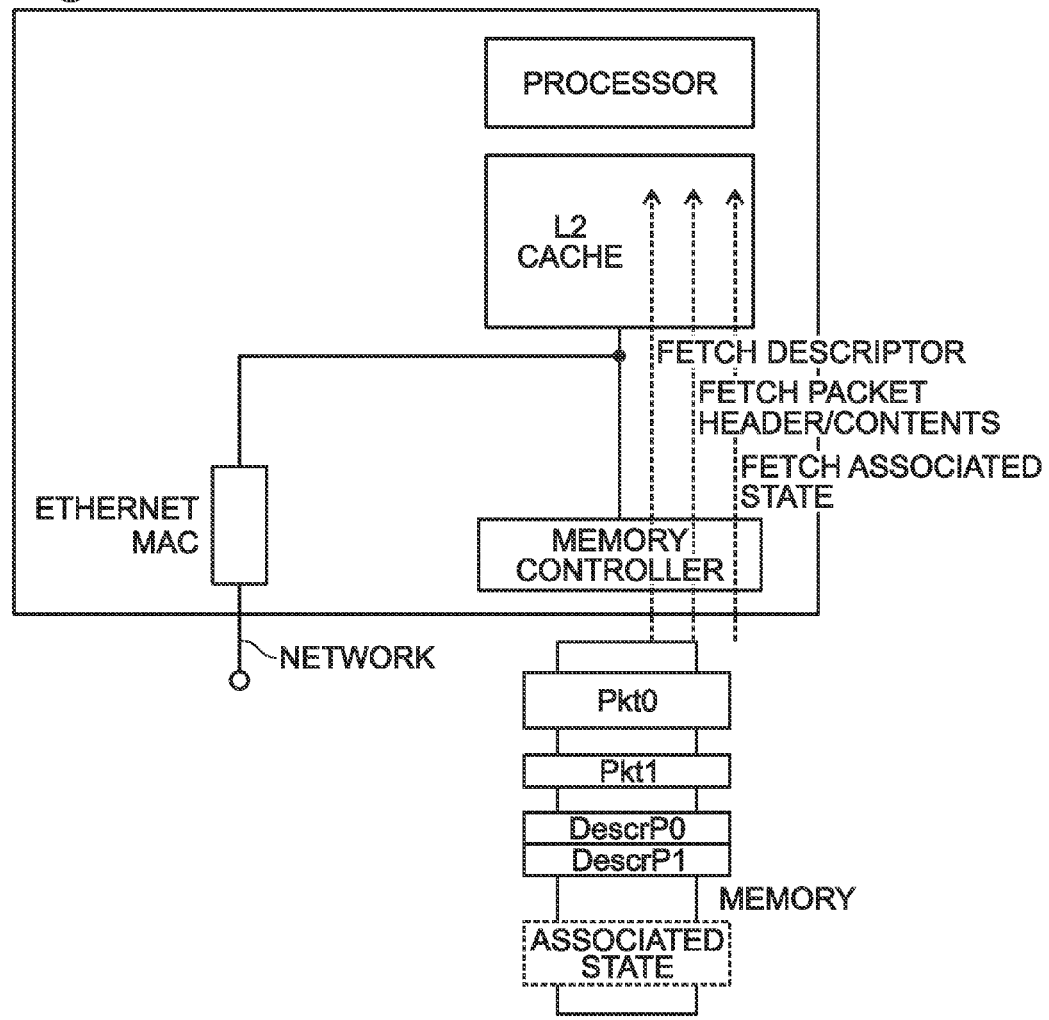

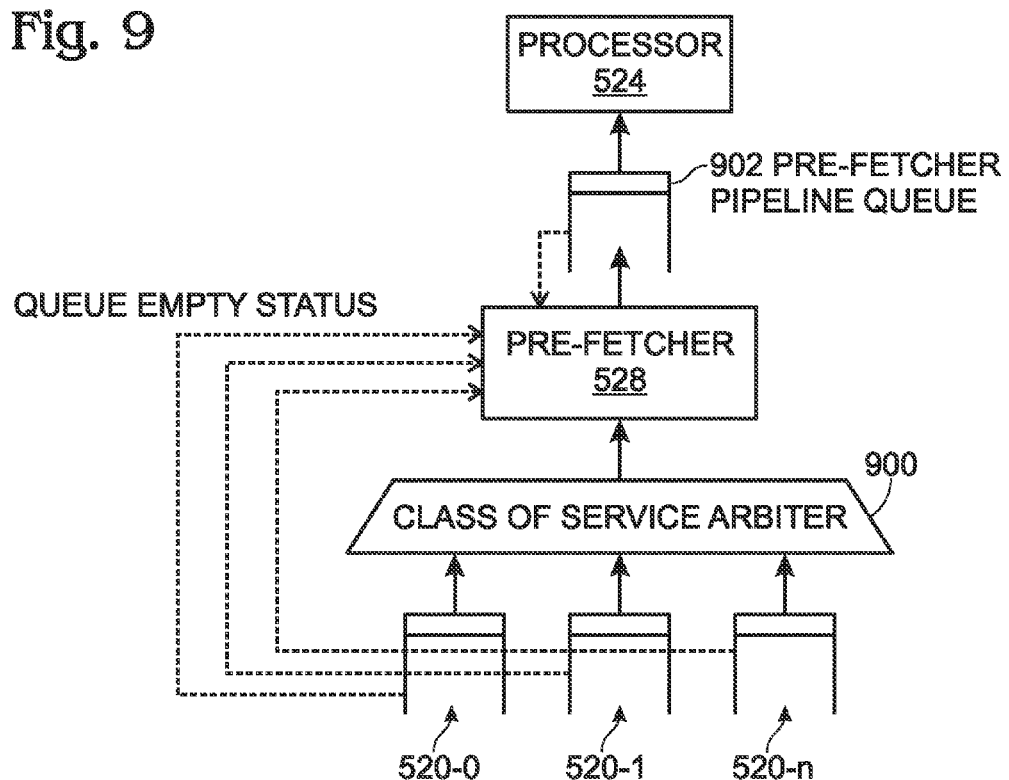

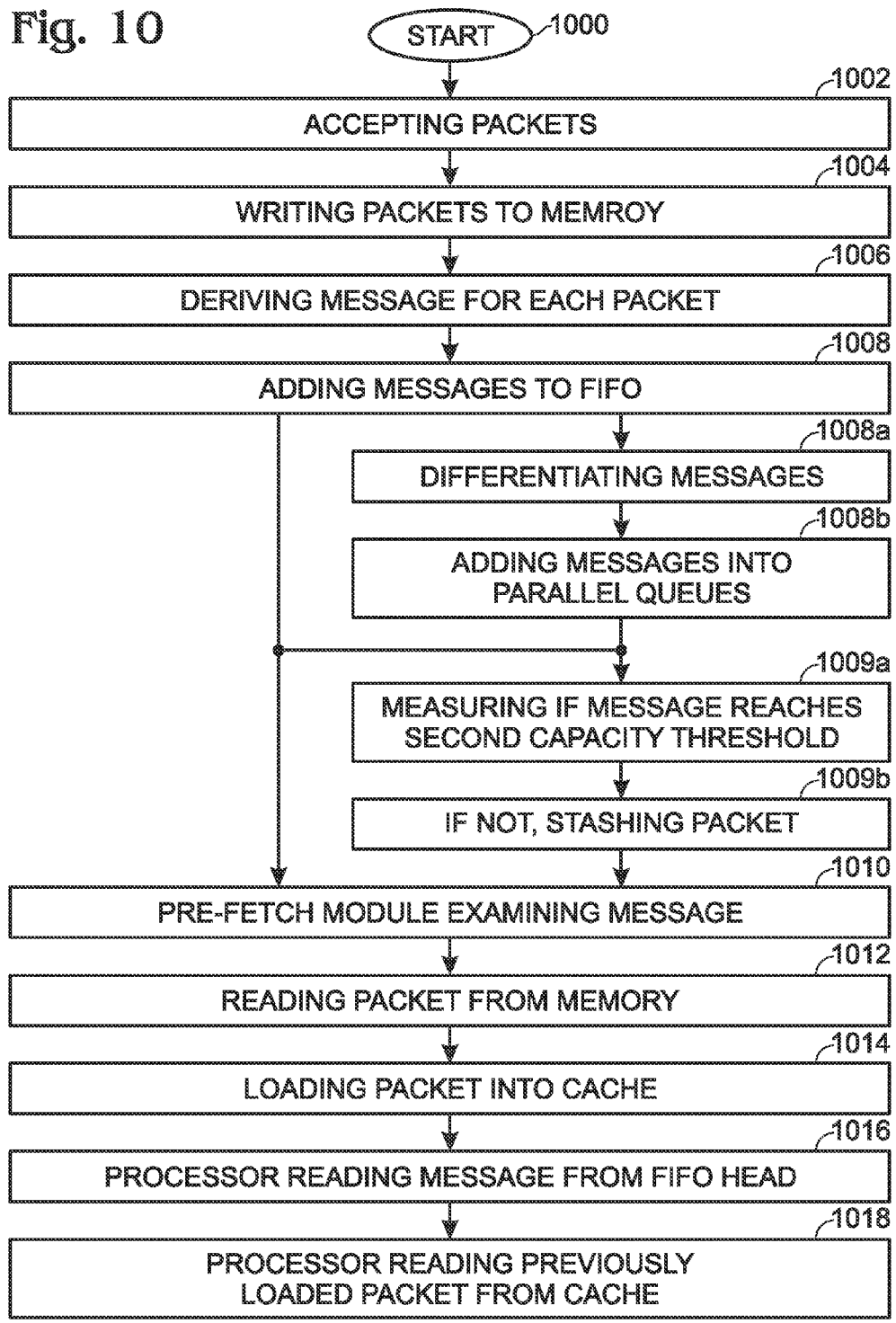

US 9,336,162 B1

SYSTEM AND METHOD FOR PRE-FETCHING DATA BASED ON A FIFO QUEUE OF PACKET MESSAGES REACHING A FIRST CAPACITY THRESHOLD

BACKGROUND OF THE INVENTION

1. Field of the Invention

This invention generally relates to computer processing and, more particularly, to a system and method for efficiently pre-fetching data into cache memory in preparation for processing.

2. Description of the Related Art

SoC—System on Chip;

Cache thrashing—A phenomenon where a processor cache is continuously loaded with new information, and wastefully unloaded;

Cache—a processor low latency memory that is used to pre-fetch information from another higher latency memory so that the processor can access the information faster. A cache is particularly useful when the same information is accessed several times, as loading it into low latency memory means that all the accesses occurring after the first access take less time than if all accesses were made to the higher latency memory where the data is originally located;

Stashing—The ability to load data into a processor cache by initiating a request from an entity other than the processor itself. This is a technique by which data can be placed into the processor cache at the same time that it is written to the memory where it is to be stored.

Data processing typically involves operating a list of descriptors that each point to a corresponding location in memory where an associated segment of data is stored. It also involves accessing a data base that contains information about how that data should be processed. For example, a data communication application accesses Transmission Control Protocol (TCP) packets that are received from an Ethernet port, and the Transmission Control Block that stores the state information for that TCP connection. Similarly, a packet forwarding application accesses the packet header in order to validate the formatting of the packet and determine how and to where that packet should be forwarded. The packet forwarding application also accesses a Forwarding or Routing Table that stores information about how that packet should be modified before forwarding, and to which Ethernet port that packet should be forwarded.

FIG. 1 is a schematic block diagram depicting memory accesses for data processing in a typical SoC (prior art). The conventional method of processing is to store a list of descriptors that point to the data, the data itself, and its associated state information all in memory. This memory may be located on-chip if the amount of memory available on chip is large enough to meet the performance requirements of the application, and the processor can guarantee that it can process this information quickly enough so as not to overflow the on-chip memory. This method is sufficient if the processing speeds or requirements of the application are low as compared to the resources available on the device. However, as the speed at which the data must be processed increases or the complexity of the processing task increases, or if the processor has to spend time processing other tasks in addition to the data processing, additional off-chip memory is typically necessary in order to insure that there is sufficient time and storage to process the data. In this situation, when the processor is ready to process the data, it first makes a request to read the descriptor at the top of a queue of descriptors that are waiting to be processed. This descriptor informs the processor of where the data is located in memory. The processor then fetches the data from memory in order to examine its contents and determine to which associated state that data belongs. Once the processor has made this determination, it makes a request for the associated state information from memory. Thus, for most data processing requests the processor must make 3 requests to memory, one to fetch the descriptor, a second to fetch the data, and a third to fetch the associated state.

FIGS. 2A through 2C are timing diagrams representing packet processing requests to off-chip memory and the associated latencies (prior art). In a typical state-of-the-art processor or SoC, the access time to off-chip memory can be as high as 100 processor cycles (FIG. 2A). However, the access time to the processor L2 cache is generally less than 20 cycles (FIG. 2B), and the access time to an L1 cache is 1 to 2 cycles (FIG. 2C). Therefore, the penalty incurred by these approaches for the three accesses to external memory is significantly larger than if that same data is available in L2 or L1 cache. If all this information is located in off-chip memory, the processor must incur the latency penalty for all these accesses. Even if the data is located in an on-chip memory, the latency penalty of accessing this data is typically longer than if the information is located in the processor cache.

FIG. 3 is a schematic block diagram depicting a descriptor and header stashing approach in an SoC (prior art). In order to reduce access latency, some approaches stash the data, the descriptor, or both, as the data arrives on the network interface. By loading the data and descriptor into the processor cache, these approaches minimize the latency penalty required for the first two (descriptor and packet) accesses. However the latency penalty for the associated state is still incurred in this approach.

FIG. 4 is a schematic block diagram depicting cache thrashing caused by stashing when the queue of data to be processed is large (prior art). Stashing the descriptor and/or data (packet) as it is being received from the network interface works well if the queue of events that the processor has to process is relatively small. In this scenario the processor needs the information being received and stashed into the cache in a short amount of time. However, if the queue of events is large, the stashing may result in the cache evicting some information that it is currently processing or is about to process. This scenario may cause cache thrashing, as the stashing pushes out some information required by the processor, only to have the processor reload that information and push out other stashed information that will shortly be required.

Additionally, if the information that is being received from the network interface is separated and queued into different Class of Service queues, with some queue arbitration scheme determining which of the queues should be processed next, then stashing may place information into cache that will not be processed for a long time, even if that particular queue is relatively empty.

It would be advantageous if the number of accesses to memory could be minimized when processing data, while avoiding the problem of cache thrashing.

SUMMARY OF THE INVENTION

Disclosed herein is a method to improve the data processing capability of a processor or on-chip accelerator by intelligently pre-fetching all necessary processing information into low latency caches or on-chip random access memories (RAMs), just before the processor requires that information or is ready to access it. Pre-fetching the necessary information reduces the amount of time the processor has to wait to access that information, and pre-fetching it just before the processor is about to process it insures that the correct information is available at the right time.

This method improves the data processing capability of a processor or on-chip accelerator, both in terms of throughput as well as latency. It is especially useful when the device is congested with a lot of processing requests pending. It provides a means of improving the performance of processors and System-on-Chip (SoC) devices with regard to both area and power efficient.

Accordingly, a method is provided for pre-fetching packet data prior to processing. The method accepts a plurality of packets and writes each packet into a memory. A message is derived for each packet, where each message includes a packet descriptor with a pointer to an address of the packet in the memory. Each message is added to a tail of a first-in first-out (FIFO) queue. A pre-fetch module examines a first message, if the first message reaches a first capacity threshold of the FIFO queue. The first capacity threshold is typically related to cache capacity. If the first message reaches the first capacity threshold, the pre-fetch module reads a first packet associated with the first message, from the memory, and the first packet is loaded into cache memory. A processor reads the first message from a head of the FIFO queue, and in response to reading the first message, reads the previously loaded first packet from cache memory.

In one aspect, the step of writing each packet into the memory also includes writing an associated state of each packet into memory, where the associated state includes information such as packet destination address, packet source address, egress port number, status of on-going communications, or combinations of the above-listed information. When the message is derived for each packet, a pointer is added to the message that points to an address in memory for a corresponding associated state. As the pre-fetch module reads the first packet from memory, it additionally reads a first associated state, corresponding to the first packet, from memory. Then, the first packet and the first associated state are both loaded into cache memory and read by the processor.

Additional details of the above-described method and a SoC with a system for pre-fetching packet data prior to processing are presented below.

BRIEF DESCRIPTION OF THE DRAWINGS

FIG. 1 is a schematic block diagram depicting memory accesses for data processing in a typical SoC (prior art).

FIG. 9 is a schematic block diagram depicting a variation of the arbitration mechanism of FIG. 6.

FIG. 10 is a flowchart illustrating a method for pre-fetching packet data prior to processing in a SoC.

DETAILED DESCRIPTION

Figure 2A:
FIGS. 2A through 2C are timing diagrams representing packet processing requests to off-chip memory and the associated latencies (prior art).
Figure 2B:
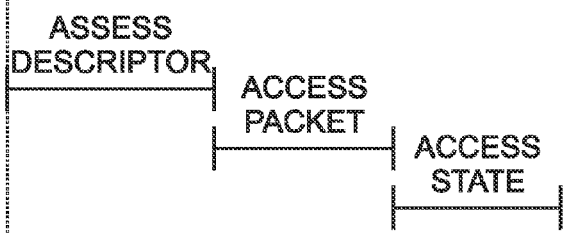
Figure 2C:
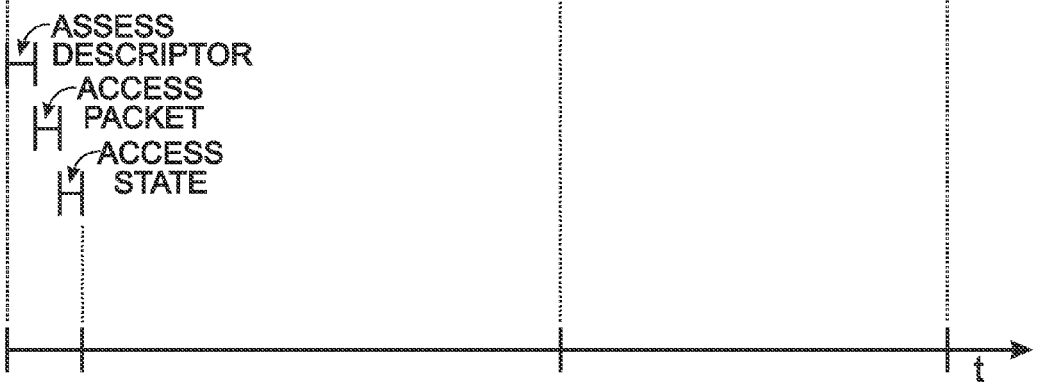
Figure 3:
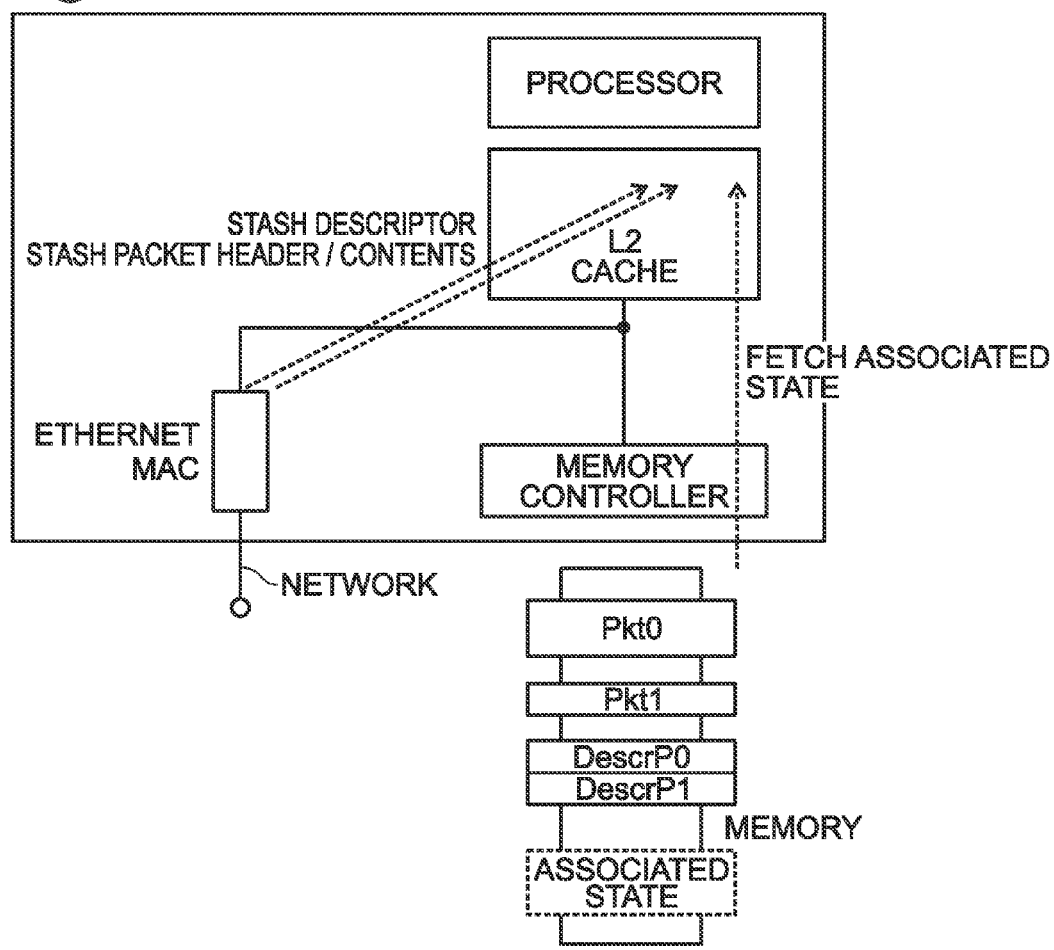
FIG. 3 is a schematic block diagram depicting a descriptor and header stashing approach in an SoC (prior art).
Figure 4:
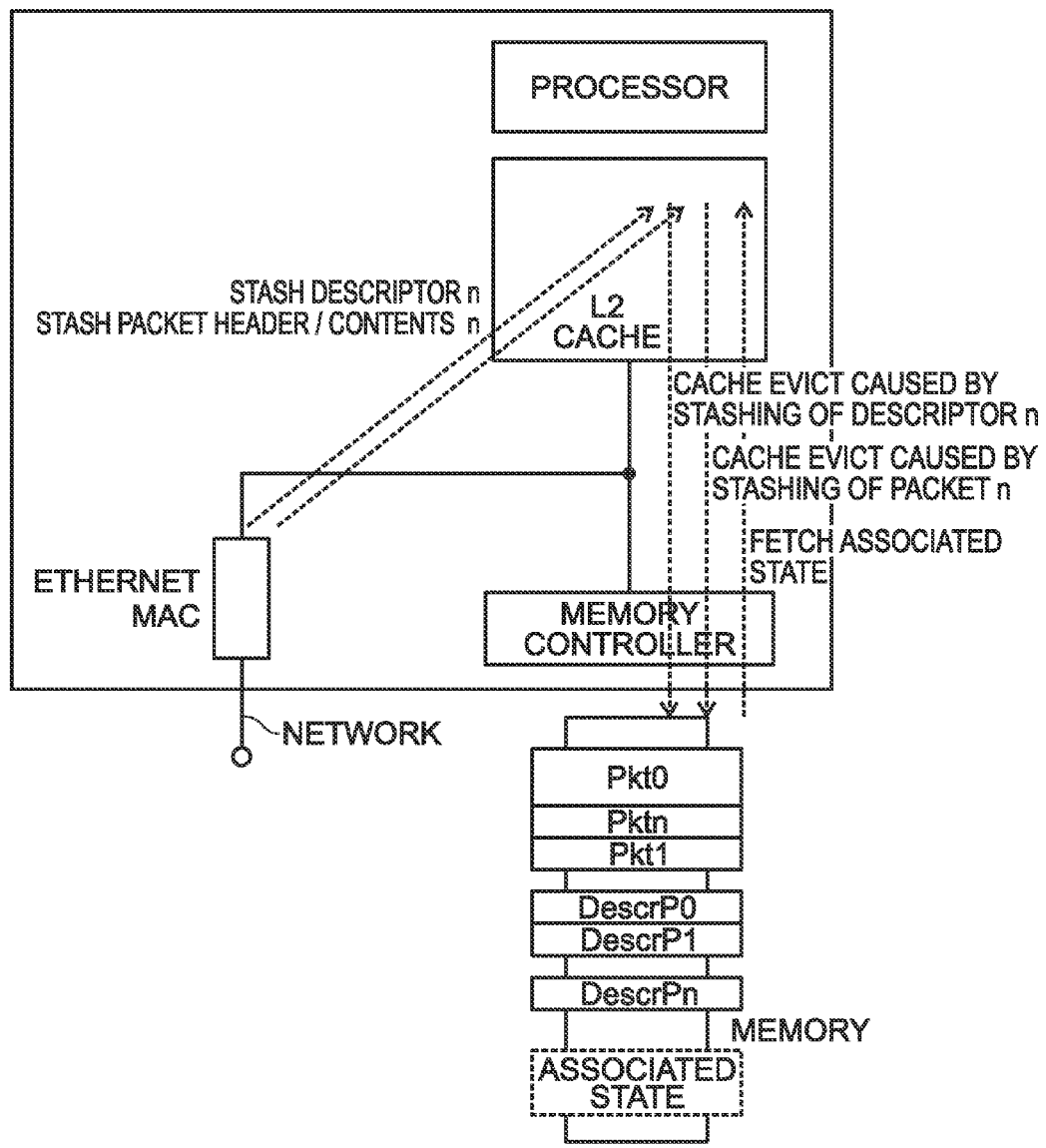
FIG. 4 is a schematic block diagram depicting cache thrashing caused by stashing when the queue of data to be processed is large (prior art).
Figure 5:
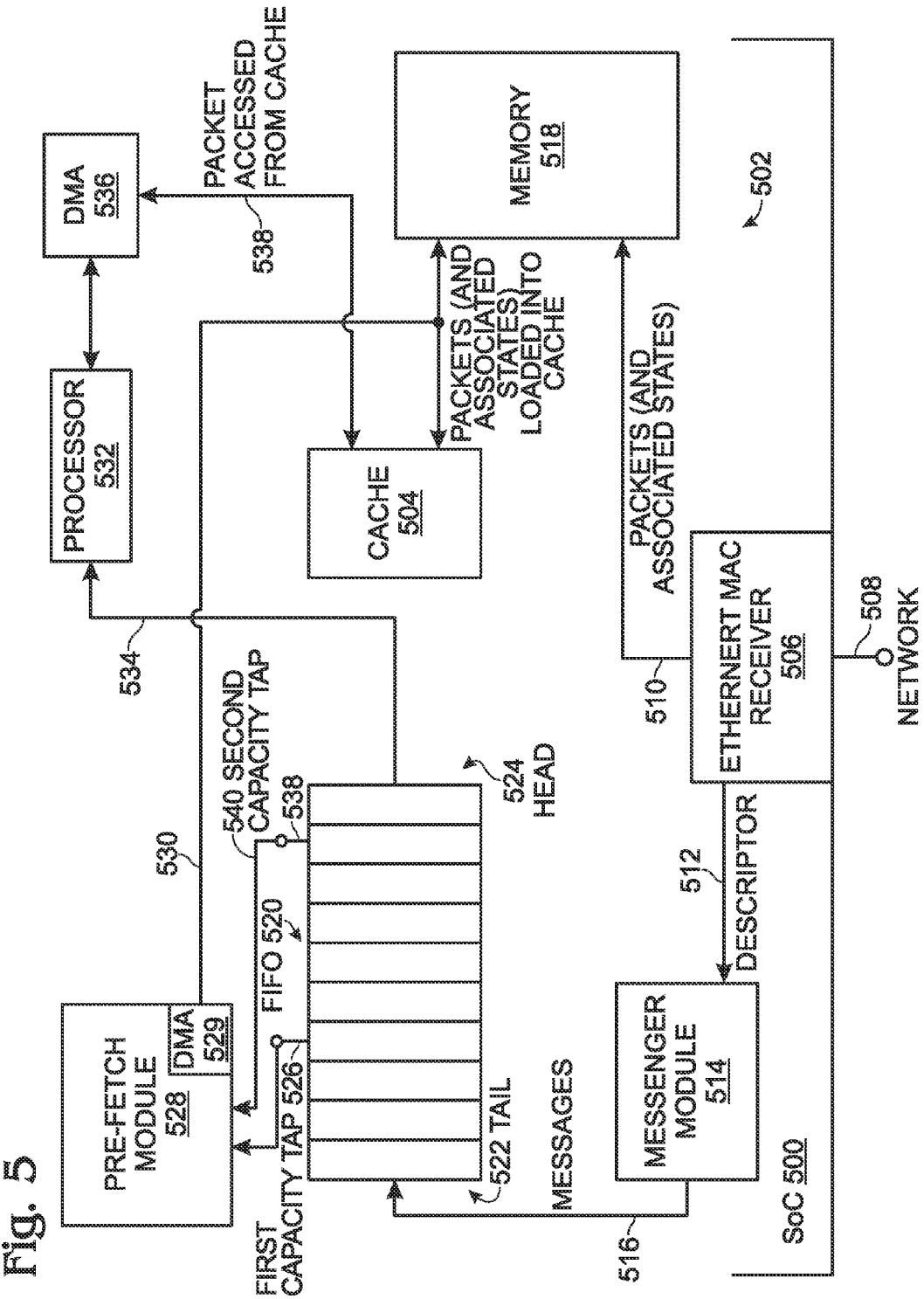
FIG. 5 is a schematic block diagram depicting a SoC with a processor, having a system for pre-fetching packet data prior to processing.

FIG. 5 is a schematic block diagram depicting a SoC 500 with a processor, having a system for pre-fetching packet data prior to processing. The system 502 comprises a cache memory 504 and an Ethernet media access control (MAC) receiver 506 having a network interface on line 508 to accept a plurality of packets. The Ethernet MAC receiver 506 has an interface on line 510 to write each packet into a memory 518, and an interface on line 512 to supply a descriptor for each packet. A messenger module state machine 514 has an interface on line 512 to accept the descriptor for each packet and has an output on line 516 to supply a message for each packet, where each message includes the packet descriptor with a pointer to an address of the packet in memory 518. As used herein, a state machine is a device that accepts an input and uses combinational logic (e.g., AND, NAND, and XOR logic) to compare the input, or values derived from the input, to values stored in registers or local RAM, to yield a result. In most instances, all the operations performed in a state machine are performed without the use of a processor or software code executed by a processor. In one aspect, the register values are programmable. For example, the values may be programmed using a software application.

A first-in first-out (FIFO) queue 520 has a tail 522 (input) to accept each message, a head 524 (output) to supply each message, and a first capacity threshold tap 526. A pre-fetch module state machine 528 has an input connected to the first capacity threshold tap 526 to examine a first message, if the first message reaches the first capacity threshold tap of the FIFO queue 520. In one aspect, the FIFO queue first capacity threshold 526 is related to a cache memory capacity. In a simple aspect, the placement of the first capacity threshold tap 526 may be set so that the packets associated with the messages in the FIFO queue, from the head 524 to the first capacity threshold tap 526, approximately fill the cache 504. Alternatively, if the pre-fetch module is allocated 50% of the cache 504 capacity, then the placement of the first capacity threshold tap 526 may be set so that the packets associated with the messages in the FIFO queue, from the head 524 to the first capacity threshold tap 526, approximately half-fill the cache 504. The threshold setting may be compensated to account for the amount of time taken for the processor to process packets, as compared to the amount of time taken for the pre-fetch module 528 to recognize the FIFO is being depleted and the latency of loading new messages into the FIFO 520. Further, the threshold setting may be compensated to account for the latency of loading packets into cache 504. That is, the threshold may be set to take into account the pre-fetch module 528 adding new messages to the FIFO 520 before the FIFO runs empty because the processor 532 has caught up processing packets.

The pre-fetch module 528 has an output on line 530 to supply commands for reading a first packet associated with the first message, from the memory 518, and loading the first packet into the cache memory 504. In one aspect as shown, a direct memory access (DMA) engine 529 associated with the pre-fetch module 528 is responsible for reading the first packet from memory 518 and loading the first packet into cache 504. In one aspect not shown, there may be a plurality of pre-fetch modules so that a plurality of packets can be loaded into cache in parallel operations.

A processor 532 has an interface on line 534 for reading the first message from the head 524 of the FIFO queue 520, and in response to reading the first message, reads the previously loaded first packet from the cache memory 504. More explicitly, the processor 532 reads the descriptor in the first message and attempts to access the first packet in memory 518. However, since the first packet has previously been loaded into cache 504, the access of memory 518 is unnecessary. In one aspect as shown, DMA engine 536 is responsible for accessing the first packet from cache memory 504 via interface 538.

In one aspect the Ethernet MAC receiver 506 writes an associated state (AS) of each packet into memory 518, where the associated state includes information such as packet destination address, packet source address, egress port number, status of on-going communications, or combinations of the above-listed information. The messenger module state machine 514 adds a pointer to the message for each packet directed to an address in memory 518 for a corresponding associated state, in addition to the packet address. The pre-fetch module 528 additionally reads a first associated state, corresponding to the first packet, from memory 518, in response to examining the first message, and loads the first associated state into the cache memory 504. The processor 532 reads the first associated state from cache memory 504, in addition to the first packet.

In one aspect, the FIFO queue 520 has a second capacity threshold tap 538. The pre-fetch module state machine 528 has an input connected to the second capacity threshold tap on line 540 for measuring if the first message reaches the second threshold capacity tap. If the first messages does not reach the second threshold capacity tap (the queue is nearly empty), the pre-fetch module state machine 528 sends commands for automatically stashing the first packet in cache memory 504, without examining the first message. In one aspect, the stashing commands are sent to DMA 529. In another aspect, the placement of the second capacity threshold tap is related to the size or an allocated use of cache 504. As noted above, the placement of the second capacity threshold tap may be additionally related to other factors such as the packet processing speed and the speed at which the cache and FIFO can be filled.

Figure 6:
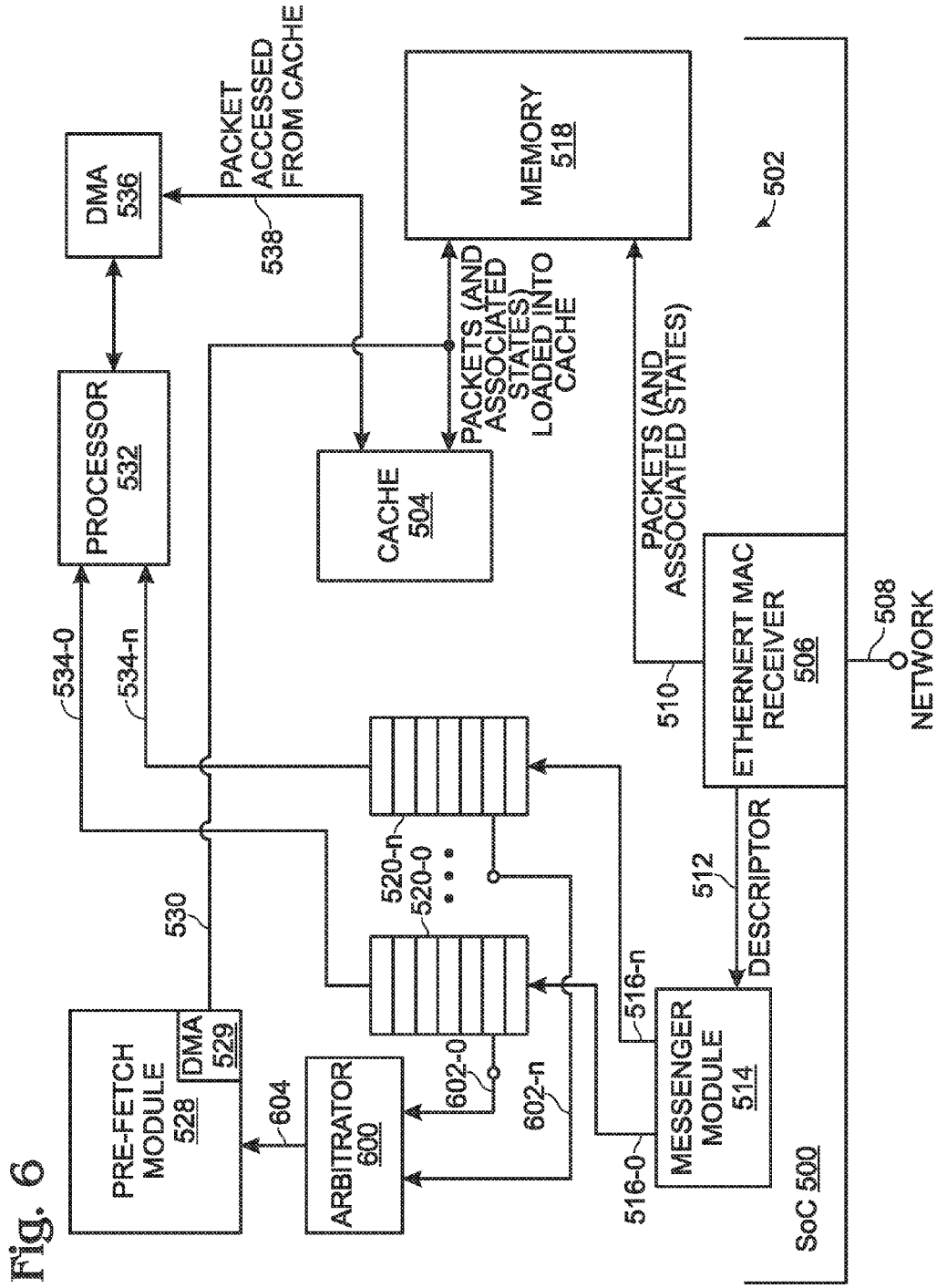
FIG. 6 is a schematic block diagram depicting a variation of the system of FIG. 5.

FIG. 6 is a schematic block diagram depicting a variation of the system of FIG. 5. In this aspect the FIFO queue is a virtual FIFO queue having a first plurality of parallel physical queues. Shown are queues 520-0 through 520-n, where n is not limited to any particular value. The messenger module state machine 514 differentiates the messages into a first plurality of n categories on the basis of a system policy, and adds the messages to the tail of a corresponding physical queue. An arbitrator state machine 600 has an input (602-0 through 602-n) connected to the first capacity threshold tap of each physical queue and an output connected to the pre-fetch module input on line 604. The arbitrator 600 selectively supplies the pre-fetch module 528 with the status of messages reaching the first capacity threshold of each parallel physical queue in response to the system policy. For example, the messenger module state machine 514 may differentiate messages on the basis of a ranked priority of categories, where the ranked priority of categories is associated with a ranked priority of parallel physical queues 520-0 through 520-n. Then, the arbitrator state machine 600 supplies status for messages to the pre-fetch module 528 from a higher priority queue prior to supplying message status from a lower priority queue. Other system policies may be based on fairness or a round-robin, to name a few. In another aspect not shown, there may a separate pre-fetch module for each queue, and the arbitrator selects between pre-fetch modules on the basis of a system policy.

Functional Description

The system described above in FIGS. 5 and 6 implement an intelligent pre-fetcher. Unlike the conventional stashing approach, the pre-fetch module 528 works on the data at the head of the queue instead of the tail of the queue. It pre-fetches information, from memory to cache, that the processor 532 is about to process just before it hands off the message to the processor. In this manner, it loads the packet into low latency cache 504 and solves the problems associated with stashing and cache thrashing. The pre-fetch module 528 may be enabled to operate at the head of the queue after arbitration (e.g., based upon Quality of Service), thus guaranteeing that the information it pre-fetches is that which the processor 532 will shortly process. Additionally, this system provides a means for the incoming data stream to add a pointer to its associated state in the descriptor itself (i.e. the message), so that the pre-fetch module can load the following three components: the descriptor list in the FIFO that points to where the data is stored in memory; the packet header or payload into cache needed for processing; and, the associated state into cache. This insures that the processor 532 has all information it needs for processing information already in the cache, thereby improving its performance significantly.

Figure 7:
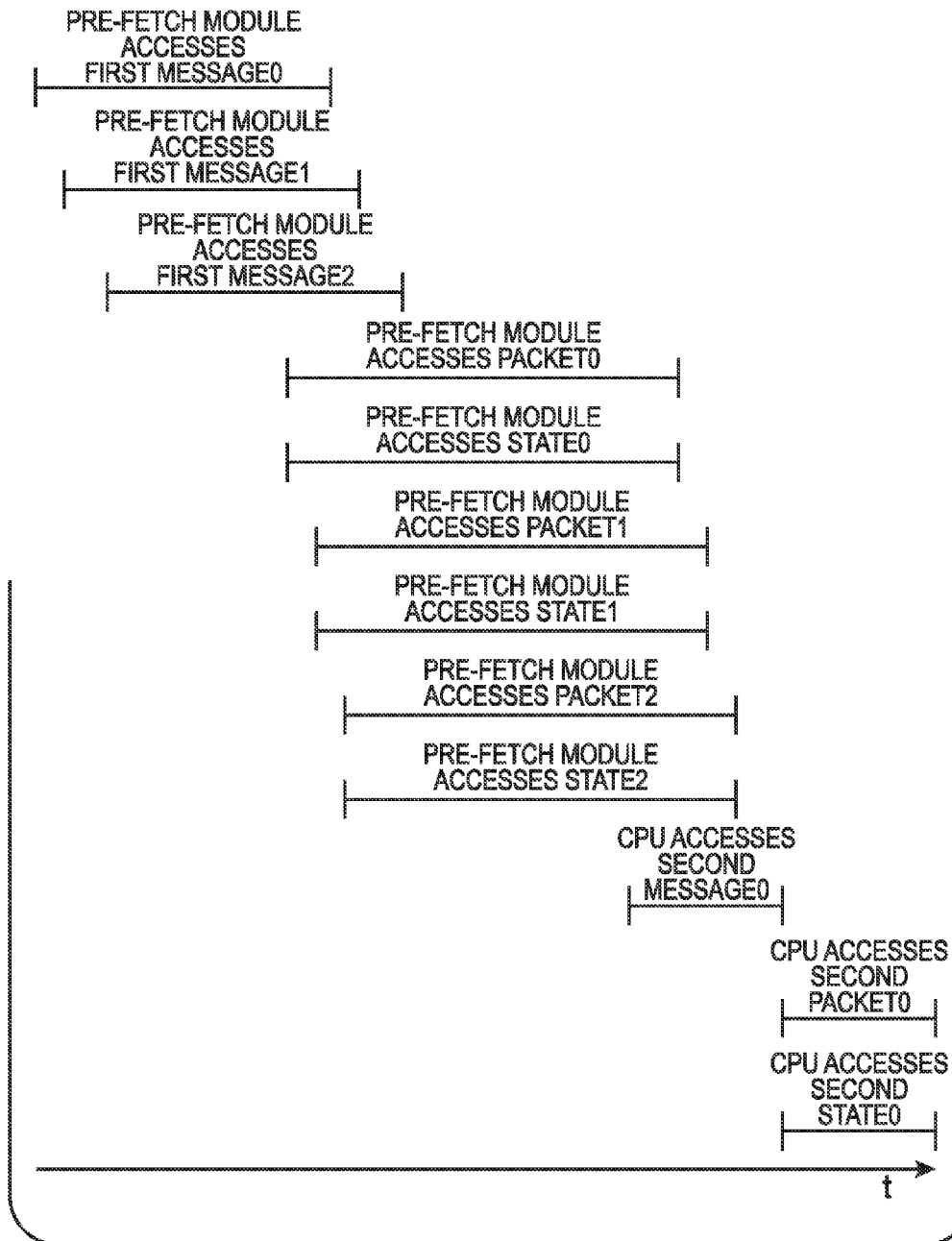
FIG. 7 is a timing diagram illustrates some advantages of the intelligent pre-fetch module.

FIG. 7 is a timing diagram illustrates some advantages of the intelligent pre-fetch module. The figure shows that the pre-fetch module can load multiple descriptors (i.e. messages with descriptors) from the head of the queue to the processor. This can be done by either allowing multiple outstanding read requests from the pre-fetch module or by having multiple instances of the pre-fetch module with each engine making one read request. Since the pointer to the associated state information is located in the message with the descriptor, the pre-fetch module can load both the packet header and the associated state information into cache simultaneously, since it does not have to wait for the packet header to determine what the associated state is. In this manner, when the processor or on-chip accelerator is ready to access the data, it has that data available in low latency cache.

The figure shows that the pre-fetch module can significantly reduce processor access latency to the data needed for processing and thus improve performance. However, it also shows that the pre-fetch module introduces some overall latency as it must load the data from memory before sending the information to the processor. This latency is hidden from the processor when the queue is full, as the intelligent pre-fetcher is loading information for packets while there are other packets that arrived earlier being processed by the processor. However, if the queue is empty, then the pre-fetch module could introduce additional latency in the path. To remove this potential latency, the pre-fetch module also has the capability to examine the queue fill (second capacity threshold) levels of the processor queue. If the queue is empty or almost empty, then the pre-fetcher uses the stashing approach to copy the incoming data into the cache as it is being written to the memory.

Figure 8:
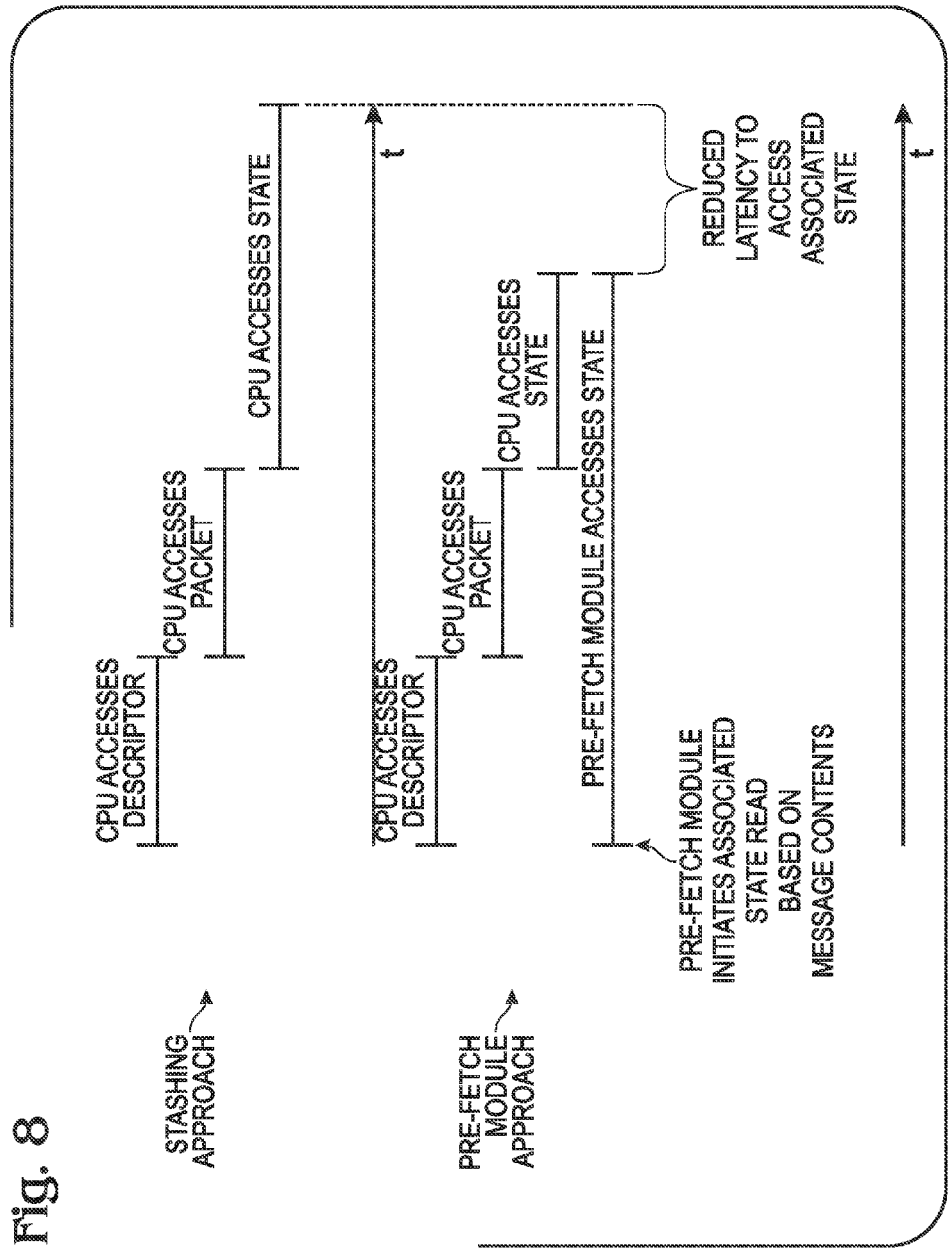
FIG. 8 is a timing diagram comparing the pre-fetching method to a conventional stashing approach.

FIG. 8 is a timing diagram comparing the pre-fetching method to a conventional stashing approach. Even when the message queue is empty, the pre-fetch module reduces latency. The pre-fetch module still improves performance, as compared to the generic stashing approach, as it can initiate the associate state read based on contents of the incoming message, instead of the processor having to first process the packet header and then make the request to load the associated state. Thus, the pre-fetch module is able to reduce the overall latency for all levels of queue congestion.

FIG. 9 is a schematic block diagram depicting a variation of the arbitration mechanism of FIG. 6. The pre-fetcher design implements a virtual pre-fetcher pipeline queue 520-0 through 520-n that determines how many entries into the queue should be pre-fetched. The aggregate queue size can be configured based on the cache size, the processing capability of the processor, and the processing power required for the application. Additionally, the amount of entries pre-fetched can be adjusted dynamically in order to retain a steady state level in the pre-fetcher queue, as the FIFO thresholds are configurable using software instructions. Multiple pre-fetch modules can also be implemented if the amount of time needed to pre-fetch all the needed information is longer than the processing time. As shown, the arbitrator 900 is implemented as a multiplexor, which selects from queues 520-0 through 520-n. The pre-fetch module 528 loads the ordered messages into a final queue 902 for delivery to processor 532.

The pre-fetcher design provides additional leverage to other packet processing systems, such as a system using a packet classification engine, which provides the ability to parse a packet and perform a lookup function in order to locate the associated state information. Further, the messaging format provides a data structure that contains the descriptor list that points to the memory locations where the packet is stored, the size of the packet, the size of the packet header, what information should be pre-fetched for that particular application (e.g., the entire packet, header only, and/or associated state, etc.), and a pointer to the associated state information. Since all pertinent information is provided in a single message to the pre-fetch module, it is able to load the information into on-chip cache from memory without any additional accesses. Also, the intelligent pre-fetch module provides additional leverage to a Queue and Traffic management (QMTM) system that provides a hardware managed queue and arbitration. This queue and arbitration engine arbitrates between all outstanding queues that have packets queued for the processor based on a predetermined algorithm, and selects the next queue from which a packet should be forwarded to the processor or accelerator.

FIG. 10 is a flowchart illustrating a method for pre-fetching packet data prior to processing in a SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 accepts a plurality of packets. Step 1004 writes each packet into a memory. Step 1006 derives a message for each packet, where each message includes a packet descriptor with a pointer to an address of the packet in the memory. Step 1008 adds each message to a tail of a first-in first-out (FIFO) queue. In Step 1010 a pre-fetch module examines a first message if the first message reaches a first capacity threshold of the FIFO queue. In one aspect, Step 1010 of examining the first message includes establishing a relationship between the first capacity threshold of the FIFO second and a cache memory capacity.

If the first message reaches the first capacity threshold, in Step 1012 the pre-fetch module reads a first packet associated with the first message, from the memory. Step 1014 loads the first packet into cache memory. In Step 1016 a processor reads the first message from a head of the FIFO queue. In response to reading the first message, Step 1018 reads the previously loaded first packet from cache memory.

In one aspect, writing each packet into the memory in Step 1004 includes writing an associated state of each packet into memory, where the associated state includes information such as packet destination address, packet source address, egress port number, status of on-going communications, or combinations of the above listed information. Deriving the message for each packet in Step 1006 includes adding a pointer to the message for each packet directed to an address in memory for a corresponding associated state. The pre-fetch module reading the first packet from memory in Step 1012 includes the pre-fetch module additionally reading a first associated state, corresponding to the first packet, from memory. Loading the first packet into cache memory in Step 1014 includes additionally loading the first associated state into cache memory, and reading the first packet from cache memory in Step 1018 includes the processor additionally reading the first associated state from cache memory.

In another aspect, adding each message to the tail of the FIFO queue in Step 1008 includes substeps. Step 1008a differentiates the messages into a first plurality of categories on the basis of a system policy. Step 1008b adds messages into the tail of a virtual FIFO queue having a corresponding first plurality of parallel physical queues. Then, the pre-fetch module examining the first message at the head of the FIFO queue in Step 1010 includes the pre-fetch module selectively examining messages reaching the first capacity threshold of each parallel physical queue in response to the system policy. For example, the messages may be differentiated into the first plurality of categories (Step 1008a) on the basis of a ranked priority of categories, where the ranked priority of categories is associated with a ranked priority of parallel physical queues. Then, the pre-fetch module selectively examining messages reaching the first capacity threshold of each parallel physical queue in Step 1010 includes the pre-fetch module examining messages in a higher priority queue prior to examining messages in a lower priority queue.

In a different aspect, Step 1009s measures if the first message reaches a second capacity threshold in the FIFO queue. If the first message does not reach the second capacity threshold, Step 1009b automatically stashes the first packet in cache memory, without the pre-fetch module examining the first message.

A system and method have been provided for pre-fetching data prior to processing. Examples of particular message structures, processors, and hardware units have been presented to illustrate the invention. However, the invention is not limited to merely these examples. This invention is useful in any data processing application using a processor or on-chip accelerator that requires access to data that is stored in an on-chip or external memory. Other variations and embodiments of the invention will occur to those skilled in the art.

We claim:

1. In a system-on-chip (SoC) with a processor, a method for pre-fetching packet data prior to processing, the method comprising:
   accepting a plurality of packets;
   writing each packet into a memory;
   deriving a message for each packet, where each message includes a packet descriptor with a pointer to an address of the packet in the memory;
   adding each message to a tail of a first-in first-out (FIFO) queue;
   a pre-fetch module examining a first message if the first message reaches a first capacity threshold of the FIFO queue;
   if the first message reaches the first capacity threshold, the pre-fetch module reading a first packet associated with the first message, from the memory;
   loading the first packet into cache memory;
   a processor reading the first message from a head of the FIFO queue; and, in response to reading the first message, the processor reading the previously loaded first packet from cache memory.

2. The method of claim 1 wherein writing each packet into the memory includes writing an associated state of each packet into memory, where the associated state includes information selected from a group consisting of a packet destination address, a packet source address, an egress port number, status of on-going communications, and combinations of the above-listed information;
   wherein deriving the message for each packet includes adding a pointer to the message for each packet directed to an address in memory for a corresponding associated state;
   wherein the pre-fetch module reading the first packet from memory includes the pre-fetch module additionally reading a first associated state, corresponding to the first packet, from memory;
   wherein loading the first packet into cache memory includes additionally loading the first associated state into cache memory; and,
   wherein reading the first packet from cache memory includes the processor additionally reading the first associated state from cache memory.

3. The method of claim 1 wherein adding each message to the tail of the FIFO queue includes:
   differentiating the messages into a first plurality of categories on the basis of a system policy;
   adding messages into the tail of a virtual FIFO queue having a corresponding first plurality of parallel physical queues; and,
   wherein the pre-fetch module examining the first message at the head of the FIFO queue includes the pre-fetch module selectively examining messages reaching the first capacity threshold of each parallel physical queue in response to the system policy.

4. The method of claim 3 wherein differentiating the messages into the first plurality of categories on the basis of the system policy includes differentiating messages on the basis of a ranked priority of categories, where the ranked priority of categories is associated with a ranked priority of parallel physical queues; and,
   wherein the pre-fetch module selectively examining messages reaching the first capacity threshold of each parallel physical queue includes the pre-fetch module examining messages in a higher priority queue prior to examining messages in a lower priority queue.

5. The method of claim 1 further comprising:
   measuring if the first message reaches a second capacity threshold in the FIFO queue; and,
   if the first message does not reach the second capacity threshold, automatically stashing the first packet in cache memory, without the pre-fetch module examining the first message.

6. The method of claim 1 wherein the pre-fetch module examining the first message, if the first message reaches the first capacity threshold of the FIFO queue, includes there being a relationship between the first capacity threshold of the FIFO second and a cache memory capacity.

7. In a system-on-chip (SoC) with a processor, a system for pre-fetching packet data prior to processing, the system comprising:
   a cache memory;
   an Ethernet media access control (MAC) receiver having a network interface to accept a plurality of packets, an interface to write each packet into a memory, and an interface to supply a descriptor for each packet;
   a messenger module state machine having an interface to accept the descriptor for each packet and having an output to supply a message for each packet, where each message includes the packet descriptor with a pointer to an address of the packet in memory;
   a first-in first-out (FIFO) queue having a tail to accept each message, a head to supply each message, and a first capacity threshold tap;
   a pre-fetch module state machine having an input to connected to the first capacity threshold tap to examine a first message, if the first message reaches the first capacity threshold tap of the FIFO queue, the pre-fetch module state machine having an output to supply commands for reading a first packet associated with the first message from the memory, and loading the first packet into the cache memory; and,
   a processor having an interface for reading the first message from the head of the FIFO queue, and in response to reading the first message, reading the previously loaded first packet from the cache memory.

8. The system of claim 7 wherein the Ethernet MAC receiver writes an associated state of each packet into memory, where the associated state includes information selected from a group consisting of a packet destination address, a packet source address, an egress port number, status of on-going communications, and combinations of the above-listed information;
   wherein the messenger module state machine adds a pointer to the message for each packet directed to an address in memory for a corresponding associated state;
   wherein the pre-fetch module additionally reads a first associated state, corresponding to the first packet, from memory, in response to examining the first message, and loads the first associated state into the cache memory; and,
   wherein the processor additionally reads the first associated state from cache memory.

9. The system of claim 7 wherein the FIFO queue is a virtual FIFO queue having a first plurality of parallel physical queues;
   wherein the messenger module state machine differentiates the messages into a first plurality of categories on the basis of a system policy, and adds the messages to the tail of a corresponding physical queue; and,
   the system further comprising:
   an arbitrator state machine having an input connected to the first capacity threshold tap of each physical queue and an output connected to the pre-fetch module input, the arbitrator state machine selectively supplying the pre-fetch module with a status of messages reaching the first capacity threshold of each parallel physical queue in response to the system policy.

10. The system of claim 9 wherein the messenger module state machine differentiates messages on the basis of a ranked priority of categories, where the ranked priority of categories is associated with a ranked priority of parallel physical queues; and,
    wherein the arbitrator state machine supplies message status to the pre-fetch module from a higher priority queue prior to supplying message status from a lower priority queue.

11. The system of claim 7 wherein the FIFO queue has a second capacity threshold tap;
    wherein the pre-fetch module state machine has an input connected to the second capacity threshold tap for measuring if the first message reaches the second threshold capacity tap, and if the first messages does not reach the second threshold capacity tap, the pre-fetch module state machine sending commands for automatically stashing the first packet in cache memory, without examining the first message.

12. The system of claim 7 wherein the FIFO queue first capacity threshold is related to a cache memory capacity.

* * * * *